United States Patent Office 3,441,887
Patented Apr. 29, 1969

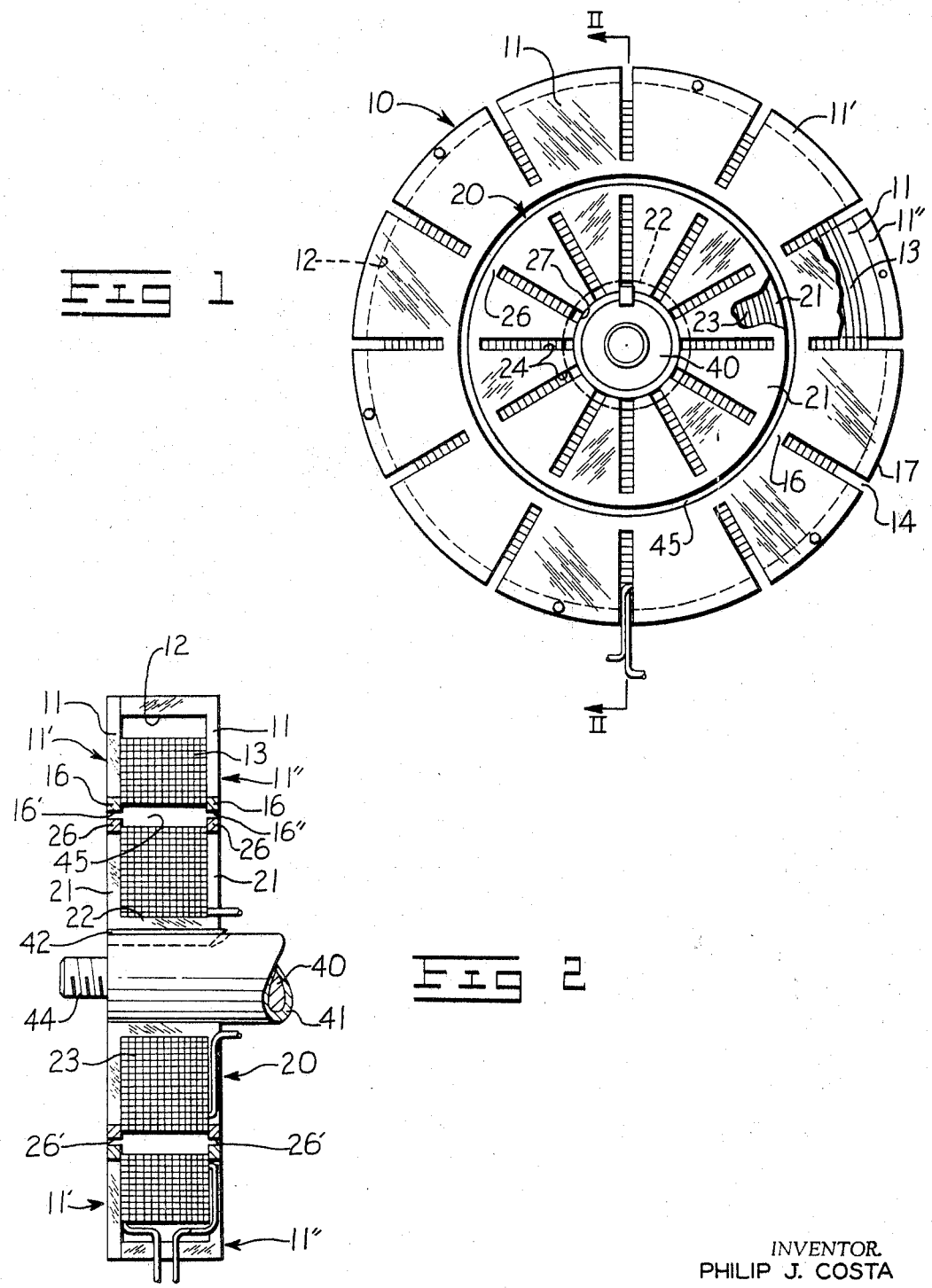
INVENTOR.
PHILIP J. COSTA

3,441,887
HIGH FREQUENCY ROTARY INDUCTIVE COUPLING
Philip J. Costa, Chillicothe, Ill., assignor to Caterpillar Tractor Co., Peoria, Ill., a corporation of California
Filed Sept. 1, 1967, Ser. No. 665,127
Int. Cl. H01f 21/02, 21/06
U.S. Cl. 336—120                                                   1 Claim

ABSTRACT OF THE DISCLOSURE

To improve the coefficient of coupling between a stationary circular primary, which may be impressed with a voltage having a frequency ranging from 200 cycles to 10 kc., and which encircles a relatively rotatable circular secondary that may rotate at speeds of 6000 r.p.m. and faster, the secondary and primary coil forms are made in the configurations of a reel and a complementary inverted reel respectively, the cores and a major portion of each of the side flanges of the reels being slotted to minimize the eddy current effect, the remaining portion of each of the side flanges of the reels being unslotted and the unslotted peripheral edges adjacent thereto being opposingly faced and defining the lateral boundaries of the air gap between the primary and secondary.

Cross reference to related application

This present application is related to assignee's copending United States patent application Ser. No. 593,064, entitled, "Brushless Direction and Speed Sensing Transducer," filed Nov. 9, 1966.

Background of the invention

The present invention relates to inductive couplings in general, and more particularly to a rotary inductive coupling which improves the magnetic coefficient of coupling between a stationary primary circumjacently positioned with respect to a secondary. The rotary coupling of the present invention is also directed to the problem of decreasing potentially damaging eddy currents in the coil forms.

It is known in the prior art to employ rotary couplings to transfer electrical energy from a primary to a secondary winding, one of which rotates with respect to the other. These conventional devices, however, are inadequate to efficiently couple a primary which is impressed with any appreciable range of voltage frequency and a secondary which may rotate at 6000 r.p.m. and faster relative to the primary. When put in this operational environment the conventional devices suffer from high eddy current, heat and power losses and from an unreasonably low coefficient of coupling. When employing the prior art couplings in the environment of voltages, the frequency of which exceeds 200 c.p.s., it has been found that appreciable power losses occur between the input and output windings. As the frequency increases towards carrier frequency, the efficiency of the prior art systems decreases with the power losses becoming progressively intolerable. In using one prior art device the primary of which was impressed with 10 watts of power at a voltage frequency of 10 kc., assignee found that the available output power was only 1 watt.

The prior art also teaches the use of laminations in building winding cores as a means of minimizing eddy currents. The use of laminations for this purpose, however, is not practicable where rotary couplings of relatively small physical dimensions are desired. Since the present invention does contemplate the use of relatively small couplings, laminations do not offer a practicable solution.

Unlike the rotary couplings of the present invention, the prior art devices also suffer from the so-called "shorted turn effect." When the cross-sectional area of a coil form is relatively large as compared to the cross-sectional area of coil contained thereby, and where the frequency of the impressed voltage is high, the magnetic path of a coil form itself acts as a "shorted turn" shorting the magnetic field. This results in intolerably high magnetic losses.

Summary of the invention

The present invention contemplates the winding of a primary coil, which may be impressed with a wide range of voltage frequency, onto a coil form having the shape of an inverted reel consisting of a slotted cylindrical core and a pair of partially slotted side flanges, and similarly winding a secondary coil onto a complementary coil form in the shape of a reel also consisting of a slotted cylindrical core and a pair of partially slotted side flanges. The secondary coil form is rotatable relative to the primary coil form. The unslotted portions of each of the two side flanges terminate in unslotted peripheral edges which face each other and which help define the air gap.

The present invention may be used advantageously in a speed and direction sensing synchro such as that set forth in detail in assignee's co-pending application referred to above wherein the rotatable secondary of the subject coupling is located on an axial extension of a prime mover, the speed and direction of rotation of which is to be sensed. In this example by employing the rotary coupling of the present invention, it is possible to couple a high frequency carrier voltage, impressed on a stationary primary, to a high speed secondary and thus eliminate the need for mechanical brushes or the like.

Accordingly, it is an object of the present invention to provide a rotary coupling for efficiently coupling a high frequency voltage above 200 c.p.s., impressed upon a stationary primary winding, to a second winding relatively rotatable thereto at speeds in the order of 6000 r.p.m. and above.

It is a further object of the present invention to provide a rotary coupling wherein the primary coil form is in the shape of an inverted reel comprising a cylindrical slotted core and a pair of partially slotted side flanges and wherein the secondary coil form is in the shape of a complementary reel also comprising a cylindrical slotted core and a pair of partially slotted side flanges and wherein the slotted areas of the coil forms are intended to minimize the magnitude of eddy currents induced therein.

It is a further object of the present invention to provide rigid primary and secondary coil forms sufficiently inflexible to contain the primary and secondary windings, and wherein the unslotted portions of the side flanges form part of the low reluctance magnetic path.

It is yet another object of the present invention to arrange the unslotted portion of each of the side flanges of each of the primary and secondary coil forms so as their adjacent unslotted peripheral edges face each other in close proximity, and hence define the lateral boundaries of the air gap between the primary and secondary windings.

Brief description of the drawing

FIG. 1 is an end view of the preferred embodiment of the invention with parts broken away; and FIG. 2 is a sectional view of FIG. 1 taken along the lines and in the direction of the arrows II—II.

Description of the preferred embodiment

A stationary primary coil form 10 comprises a pair of spaced-apart side flanges 11 secured to a cylindrical core 12, which, when assembled, take the configuration of an inverted reel within which a primary coil 13 is secured. To facilitate the installation of coil 13, the primary coil form may be constructed in two parts comprising a circular plate 11' and a mating L-shaped circular part 11". The side flanges 11 and core 12 have a plurality of slots 14 formed therein. The slots in the side flanges 11 extend radially inwardly from the outer periphery 17 of the coil form to a depth limited only by the requirement of an unslotted side flange portion 16 to provide rigidity for the coil form and to prevent tooth ripples in the induced secondary voltage. The primary coil form is located circumjacent a rotatable and complementary secondary coil form 20 adapted to be rotated by a concentrically located drive shaft 40.

The secondary coil form 20 in the shape of a reel comprises a pair of side flanges 21 and a cylindrical core 22. A secondary coil 23 is wound upon the secondary coil form which has a plurality of slots 24 formed in the core and side flanges. The slots in the side flanges 21 extend radially outwardly from the inner periphery 27 of the coil form to a height limited only by the requirement of an unslotted side flange portion 26 for reasons identical to those stated above relating to the configuration of coil form 10.

Shaft 40 carries a non-magnetic sleeve 41 both of which are slotted to receive key 42 for assuring the common rotation of shaft 40, sleeve 41 and secondary coil form 20. Shaft 40 terminates in a reduced end portion threaded at 44 to receive a nut and washer (not shown). The other end of shaft 40 is integral with or secured to a prime mover also not shown.

The coil forms may be constructed from suitable material such as sintered iron. Particularly good results have been found by constructing the forms from annealed 10-10 steel. The cross-sectional area of the coil forms is preferably kept to a minimum to avoid the so-called "shorted turn effect" which arises when the frequency of the impressed voltage is high and the ratio between the cross-sectional area of the coil form and the cross-sectional area of the coil is high.

The side flanges and cores may be as thin as ⅛ inch which is consistent with the need to give the coil forms sufficient rigidity. Since the side flanges form part of the low reluctance magnetic path, it is necessary that their width be greater than the maximum expected radial end play of the prime mover, the speed and direction of which is being monitored. In the present example, where the width of the side flanges and core is ⅛ inch, the end play expected was ¹⁄₁₆ inch.

The air gap 45 between the coils 13 and 23 has lateral boundaries defined by the oppositely-faced unslotted peripheral edges 16' and 26' adjacent unslotted side flange portions 16 and 26 respectively. The slots 24 in the side flanges of the secondary coil form terminate at the surface of nonmagnetic sleeve 41. Slots 14 in the side flanges of the primary coil form terminate in a housing (not shown) of a nonmagnetic material. This arrangement serves to increase magnetic flux linkage and hence provides a good coefficient of coupling.

I claim:
1. An inductive coupling for transferring electrical energy between rotating and stationary structure, comprising
an annular stationary outer coil form of ferromagnetic core material having a cylindrical center portion and end portions which extend radially inward towards the axis thereof, said stationary coil form having a plurality of slots each extending axially along said center portion and extending radially inwardly along each of end portions but terminating short of the radially innermost annular surface of said end portions whereby said annular surfaces are free from discontinuity,
a first winding disposed in said stationary coil form in the region between said end portions thereof,
an annular rotating inner coil form of ferromagnetic core material disposed coaxially with respect to said stationary coil form and having a second cylindrical center portion with flange portions which extend radially outward at each end thereof and have annular radially outermost surfaces spaced from said innermost surfaces of said end portions of said stationary coil form to define a pair of air gaps in conjunction therewith, said rotating coil form having a plurality of slots each extending axially through said center portion thereof and extending radially outward along each of said flange portions thereof but terminating short of said annular outermost surfaces thereof, whereby said annular surfaces of said rotating coil form are also free of discontinuities, and
a second winding disposed between said flanges of said rotating coil form.

References Cited

UNITED STATES PATENTS 2,432,892 12/1947 Braddon et al. ____ 336—120 XR
3,328,735 6/1967 Honsinger _____ 336—120

LEWIS H. MYERS, *Primary Examiner.*

T. J. KOZMA, *Assistant Examiner.*

U.S. Cl. X.R.
310—254, 265